United States Patent [19] [11] 4,389,543
Granirer et al. [45] Jun. 21, 1983

[54] TELEPHONE-ACTIVATED AUDIO CONTROL CIRCUIT

[75] Inventors: Martus Granirer, 100 S. Mountain Rd., New City, N.Y. 10956; Andrew Jason, Miami, Fla.

[73] Assignee: Martus Granirer, New City, N.Y.

[21] Appl. No.: 217,998

[22] Filed: Dec. 18, 1980

[51] Int. Cl.³ .......................................... H04M 11/00
[52] U.S. Cl. ................................. 179/2 B; 179/18 FA
[58] Field of Search ................ 179/1 MN, 2 B, 2 TC, 179/18 FA

[56] References Cited

U.S. PATENT DOCUMENTS

| | | | |
|---|---|---|---|
| 3,523,823 | 10/1970 | Ellis | 179/2 B |
| 3,622,709 | 11/1971 | Tjaden | 179/18 FA |
| 4,079,201 | 3/1978 | Scott et al. | 179/2 TC X |
| 4,079,208 | 3/1978 | Rogers et al. | 179/18 FA |
| 4,220,825 | 9/1980 | Fahey | 179/18 FA |
| 4,323,734 | 4/1982 | Kimzey | 179/18 FA |
| 4,338,492 | 7/1982 | Snopko | |

FOREIGN PATENT DOCUMENTS

| | | | |
|---|---|---|---|
| 55-135407 | 10/1980 | Japan | 179/2 B |
| 1201093 | 8/1970 | United Kingdom | 179/18 FA |

Primary Examiner—G. Z. Rubinson
Assistant Examiner—Keith E. George
Attorney, Agent, or Firm—Michael J. Striker

[57] ABSTRACT

The inputs of an operational amplifier are connected across a telephone line and bridged by a capacitor. The output of the operational amplifier drives the coil of a relay via an intermediate amplifier. The relay is of the make-before-break type, and is interposed between an audio source, audio speakers, and dummy load resistors. When the voltage across the telephone line indicates an on-hook condition for a telephone, the audio source is connected to the speakers through the relay. When the voltage across the telephone lines indicates an off-hook condition of the telephone, the audio source is connected to the dummy resistors and disconnected from the speakers and is thereby muted, enabling telephone conversation to take place.

9 Claims, 1 Drawing Figure

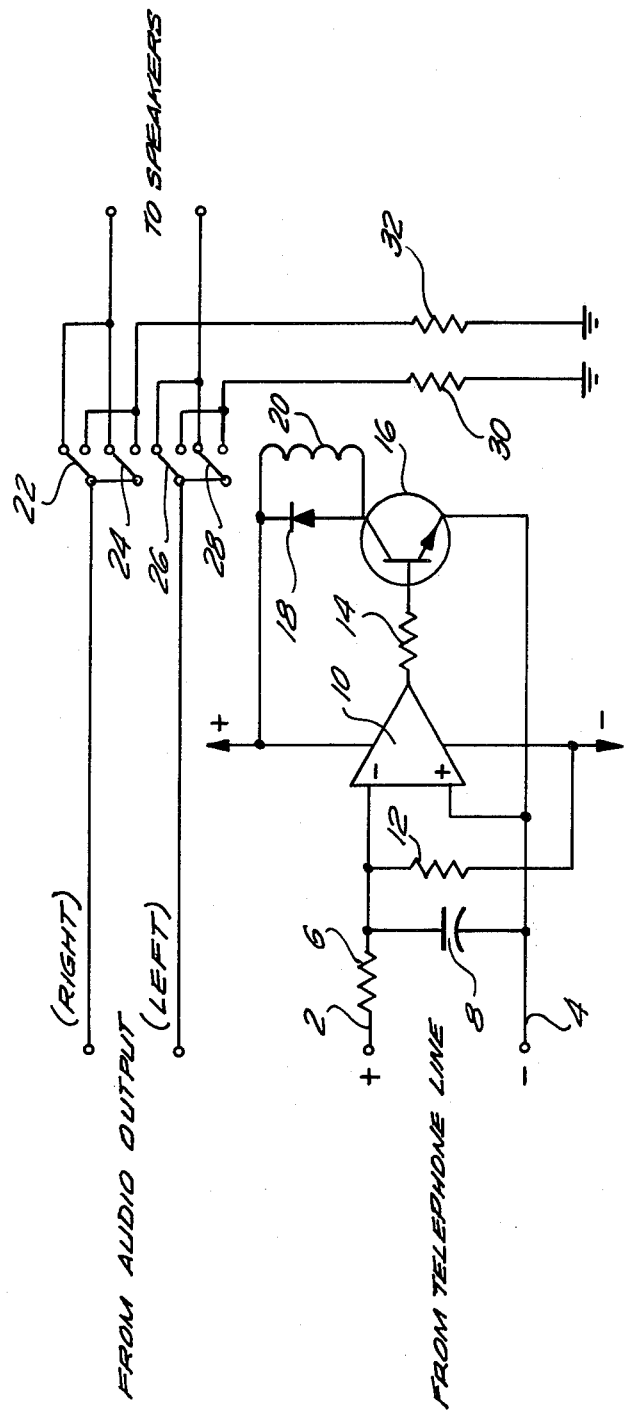

TELEPHONE-ACTIVATED AUDIO CONTROL CIRCUIT

BACKGROUND OF THE INVENTION

This invention pertains to circuits which can be used with telephone lines to detect on- and off-hook conditions of a telephone and thereby control other apparatus in response to such conditions. For example, a source of audio in a room can reduce a caller's or a listener's ability to hear a telephone call after the telephone receiver has been taken off the hook in order to answer the call.

In the event that a circuit is to be provided which automatically causes such an audio source to be muted, the circuit must be undetectable so as to prevent any damage to, or degradation of, telephone service. Moreover, such a circuit must not interfere with the audio source when the telephone is off- or on-hook. Finally, it would be desirable for such a circuit to remain uninfluenced by any AC component across the telephone line, so as to prevent improper alternating muting of the audio source.

SUMMARY OF THE INVENTION

These objects, among others which will become apparent hereinafter, are achieved by the use of this invention. In this invention, a high-impedance front end is provided, which front end essentially isolates the invention from the telephone system by drawing a minimal amount of current. This front end is connected to a comparator, which compares the voltage across the telephone line to the voltage of a voltage reference source. It is known to those skilled in the art that when a telephone is brought off-hook from an on-hook state, there will be an appreciable voltage drop across its telephone line. The comparator used in this invention can then produce a changing control voltage, which can be used to drive other elements, which elements may include an amplifier and a relay, in order to shunt the output from an audio source and thereby mute it so as to enable a listener to hear an incoming or outgoing telephone conversation.

According to an advantageous feature of this invention, an AC bypass may be provided in the front end of the circuit. This AC bypass prevents the AC telephone ring signal from being interpreted as an alternating on- and off-hook condition of the telephone, and thereby prevents false muting of the audio source in the event that the telephone has been disconnected from its line or in the event that its bell has been muted in order to avoid disturbing a listener.

The novel teachings which are considered as characteristic for the invention are set forth in particular in the appended claims. The invention itself, however, both as to its construction and its method of operation, together with additional objects and advantages therefor, will be best understood from the following description of specific embodiments when read in connection with the accompanying drawings.

BRIEF DESCRIPTION OF THE DRAWINGS

The single FIGURE shows a schematic diagram of the invention.

DETAILED DESCRIPTION OF PREFERRED EMBODIMENTS

Incoming lines 2 and 4 are connected, respectively, to the tip (+) and ring (−) sides of a telephone line. Line 2 is connected to one end of resistor 6, with the other end of resistor 6 being connected to one plate of capacitor 8. The other end of capacitor 8 is connected to line 4. Resistor 6 is chosen to have a sufficiently high value that the input impedance of the circuit as measured between lines 2 and 4 is sufficiently high so as to make it draw a negligible amount of current from the telephone line and thereby be electrically independent thereof. Such independence makes the device undetectable from the telephone line and does not interfere with conventional telephone service.

Capacitor 8 bridges across the inverting and non-inverting inputs of operational amplifier 10. Operational amplifier 10 is supplied by a conventional DC power supply (not shown). The ground side of this unshown DC power supply is connected to the inverting input of operational amplifier 10 via resistor 12.

When a telephone line to which lines 2 and 4 are connected is connected to an on-hook telephone, the voltage across lines 2 and 4 is relatively high. Since this high voltage is taken with respect to line 4, and since line 2 is connected to the inverting input of operational amplifier 10 via resistor 6, an on-hook telephone will cause the control voltage which appears at the output of operational amplifier 10 to be negative.

However, when the telephone is taken off-hook, the voltage across line 2 and 4 will drop abruptly. Moreover, the voltage at the cold side of the DC power supply will be impressed on the inverting input of operational amplifier 10, with only minimal voltage drop across resistor 12, since the input impedance of operational amplifier 10 is extremely high. Thus, the control voltage at the output of operational amplifier 10 will rise above zero when the telephone is taken off-hook.

One end of resistor 14 is connected to the output of operational amplifier 10. The other end of resistor 14 is connected to the base of NPN transistor 16. The emitter of transistor 16 is connected to line 4, while the collector of transistor 16 is connected to the anode of diode 18 and one end of relay coil 20. The other end of relay coil 20 is connected to the hot side of the DC power supply, as is the cathode of diode 18.

When the control voltage at the output of operational amplifier 10 rises sufficiently, current will flow through the base-emitter circuit of transistor 16. This, in turn, will cause current to flow through the collector-emitter circuit of transistor 16 through coil 20, since transistor 16 is connected as a common-emitter amplifier. Hence, when a telephone is taken off-hook, current will flow through coil 20. Diode 18 is reverse-biased across coil 20 so as to prevent transistor 16 from burning out as a result of reverse EMF developed across coil 20 when voltage across lines 2 and 4 subsequently rises. After current through coil 20 is shut off, coil 20 is shunted in reverse so as to dissipate reverse EMF.

Coil 20 is the energizing coil for a 4-pole double-throw relay having contact arms 22, 24, 26, and 28. One end of each of arms 22 and 24 is connected to the right channel of an audio source (not shown), while one end of each of arms 26 and 28 is connected to the left channel.

Arms 22, 24, 26, and 28 all move together simultaneously. When coil 20 is unenergized, the audio source is connected to suitable speakers (not shown) via arms 22, 24, 26, and 28. However, when coil 20 is energized, the output of the audio source is connected to its return line--the left channel being connected through resistor 30, while the right channel is connected through resistor 32. Resistors 30 and 32 thus serve as dummy loads. The relay is constructed as a make-before-break relay, and resistors 30 and 32 are chosen to have values which correspond to or exceed the impedance of the speakers. Thus, when coil 20 is energized, the minimum impedance to which the audio source is subjected is equal to a momentary value of one-half the impedance of the speakers, which is an impedance change which will not harm any conventional audio source.

When a telephone is on-hook, the voltage across lines 2 and 4 will be sufficiently high so that the control voltage at the output of operational amplifier 10 will be either negative of insufficient to turn transistor 16 on. In this situation, the audio source will be connected to the speakers through the relay. When the ring current of an incoming telephone call causes an AC voltage across lines 2 and 4 to be developed, the AC component will be bypassed through a bypass path formed by capacitor 8 and will thus leave the rest of the circuitry unaffected. However, when the telephone is taken off-hook, the voltage across lines 2 and 4 will drop, causing the control voltage at the output of operational amplifier 10 to turn transistor 16 on and thereby energize coil 20. Such energization will, in turn, cause the audio source to be connected to resistors 30 and 32, disconnecting the speakers and muting the source so that a telephone conversation can take place.

When the telephone is brought on-hook once again, capacitor 8 will require some time in order to charge up once again and thereby cause transistor 16 and coil 20 to be turned off. This period of time is sufficient to delay response of operational amplifier 10 to such phenomena as dialing of a telephone call or as a brief on-hook condition intermediate two telephone conversations. After capacitor 8 has been charged once again, transistor 16 is turned off and protected from reverse EMF from coil 20 via diode 18.

Thus, the objects of the invention are achieved. The circuit disclosed loads the telephone line only minimally, preventing any damage thereto. By use of a relay, there is no distortion of the audio from the audio source such as might be introduced by a semiconductor device. Finally, capacitor 8 not only provides an AC bypass which prevents the circuit from being turned on and off by telephone ring signals, but also provides a time delay during which audio is muted while, e.g., an outgoing call is dialed or a brief hangup between two closely-spaced telephone conversations takes place.

It will be understood that each of the elements described above, or two or more together, may also find a useful application in other types of constructions differing from the types described above.

While the invention has been illustrated and described as embodied in a telephone-activated audio control circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circuit for use with telephone lines and the like, designed to mute an audio source after a telephone receiver has been taken off the hook, comprising: a high-impedance front end which can be connected across a telephone line and which can respond to voltage changes thereacross; a comparator connected to the front end and comparing voltage across the telephone line to a voltage reference source, the comparator having an output at which a control voltage proportional to a difference between the voltage reference source and voltage across the telephone line appears; and control means coupled to the output of said comparator and connected to said audio source to activate or deactivate the source in response to changes in said control voltage.

2. The circuit defined by claim 1, wherein the front end contains an AC bypass path, whereby the circuit is made responsive to changes in DC voltage across the telephone line.

3. The circuit defined by claim 2, wherein the AC bypass path operates as a time delay which delays response of the circuit to an increase in voltage across the telephone line.

4. The circuit defined by claim 1, wherein said control means includes a relay with a coil responsive to the control voltage.

5. The circuit defined by claim 4, further including a reverse-biased diode connected across the coil.

6. The circuit defined by claim 4, wherein the relay is of a make-before-break type.

7. The circuit defined by claim 4, further including an amplifier interposed between said output or the comparator and the coil.

8. The circuit defined by claim 7, wherein the amplifier is a transistor.

9. The circuit defined by claim 1, wherein the comparator is an operational amplifier.

* * * * *